US005768124A

United States Patent [19]

Stothers et al.

[11] Patent Number: 5,768,124

[45] Date of Patent: Jun. 16, 1998

[54] ADAPTIVE CONTROL SYSTEM

[75] Inventors: I. Stothers, Nr. Thethford; A. M. McDonald, Norfolk; S. M. Hutchins, Huntingdon; C. L. Bowles, Welbourne, all of United Kingdom

[73] Assignee: Lotus Cars Limited, Norfolk, United Kingdom

[21] Appl. No.: 416,762

[22] PCT Filed: Oct. 21, 1993

[86] PCT No.: PCT/GB93/02169

§ 371 Date: Apr. 13, 1995

§ 102(e) Date: Apr. 13, 1995

[87] PCT Pub. No.: WO94/09480

PCT Pub. Date: Apr. 28, 1994

[30] Foreign Application Priority Data

Oct. 21, 1992 [GB] United Kingdom ................. 92922103

[51] Int. Cl.$^{6}$ .................................................... G05B 13/02

[52] U.S. Cl. ........................... 364/158; 364/159; 381/71; 381/94

[58] Field of Search .................................... 364/158–160, 364/574; 381/71, 94, 46, 47

[56] References Cited

U.S. PATENT DOCUMENTS

| | | | |
|---|---|---|---|
| 4,689,821 | 8/1987 | Salikuddin et al. | 381/71 |
| 4,862,506 | 8/1989 | Landgarten et al. | 381/71 |
| 5,029,218 | 7/1991 | Nagayasu | 381/71 |
| 5,170,433 | 12/1992 | Elliott et al. | 381/47 |

FOREIGN PATENT DOCUMENTS

| | | |
|---|---|---|
| 0 492 680 A2 | 11/1991 | European Pat. Off. . |
| 0 465 174 A2 | 1/1992 | European Pat. Off. . |
| 0 530 523 A2 | 3/1993 | European Pat. Off. . |
| 5011774 | 1/1993 | Japan . |
| 5040486 | 6/1993 | Japan . |
| 2 234 881 | 2/1991 | United Kingdom . |

OTHER PUBLICATIONS

*Transactions of the Society of Instrument Technology*, "Automatic Optimization", by P.E. W. Grensted et al., Sep. 1961, pp. 203–212.

*Journal of the Acoustical Society of America*, "Use of ramdon noise for on–line transducer modeling in an adaptive active attenuation system", by L.J. Ericksson and M.C. Allie, Feb. 1989, vol. 85, No. pp. 797–802.

*Primary Examiner*—Reba I. Elmore
*Assistant Examiner*—Robert J. Dolan
*Attorney, Agent, or Firm*—Westman, Champlin & Kelly, P.A.

[57] ABSTRACT

An adaptive control system for reducing undesired signals comprises a processor (36) to generate secondary signals which are provided to secondary sources (37). Sensors (42) provide at least one residual signal to said processor (36) which is indicative of the interference between the undesired and secondary signals. The processor (36) is operative to adjust the secondary signals using the residual signals to reduce the residual signals. If the adaptive control system operates erroneously or there is a fault this is indicated. Such faults can be detected by increasing and decreasing the secondary signals and detecting whether there is a corresponding increase and decrease in the residual signals. Also, the rate of change of the amplitude of the secondary signals and the rate of change of the frequency of the reference signal can be monitored to determine whether a fault condition exists. Also the impulse response or transfer function of the system can be monitored to determine a fault condition.

29 Claims, 5 Drawing Sheets

ADAPTIVE CONTROL SYSTEM

The present invention relates to an adaptive control system and method for reducing undesired primary signals generated by a primary source of signals.

The basic principle of adaptive control is to produce a cancelling signal which interferes destructively with the primary signals in order to reduce them. The degree of success in cancelling the primary signals is measured to adapt the cancelling signal to increase the reduction of the undesired primary signals.

This idea is thus applicable to any signal such as electrical signals within an electrical circuit in which undesired noise is produced. One particular area which uses such adaptive control is in the reduction of unwanted acoustic vibrations in a region.

It is to be understood that the term "acoustic vibration" applies to any acoustic vibration including sound and mechanical vibration.

There has been much work performed in this area with a view to providing a control system which can adapt quickly to changes in amplitude and frequency of vibrations from a source. Such systems are generally considered in "Adaptive Signal Processing", by B. Widrow and S. D. Stearns. One such system is disclosed in WO88/02912 the content of which is hereby incorporated by reference. In this document a controller is disclosed which is implemented as a digital adaptive finite impulse response (FIR) filter. In order for the filter to be adapted the filter coefficients must be modified based on the degree of success in cancelling the undesired vibrations. For the control system disclosed in this document there are a large number of error signals, drive signals and reference signals and there are therefore a large number of calculations which must be performed. In the arrangement disclosed in WO88/02912 the coefficients are updated adaptively using an algorithm. In practice, there is a possibility that the adaptive control system will become unstable and it can possibly even contribute to the noise which it is supposed to be trying to cancel out.

It is therefore an object of the present invention to provide an adaptive control system which can detect erroneous or faulty operation of the system and can provide an indication of a fault which can be used to shut the system down.

The present invention provides an adaptive control system for reducing undesired signals comprising secondary means to provide at least one secondary signal for interference with said undesired signals; residual means to provide at least one residual signal indicative of the interference between said undesired and secondary signals; adaption means operative to adjust said at least one secondary signal using said at least one residual signal to reduce said at least one residual signal; and adaption fault detection means to detect erroneous or faulty operation of the system and provide an indication of a fault.

Preferably the adaption means comprises adaptive response filter means having filter coefficients and adapted to adjust said at least one secondary signal using said filter coefficients.

In one embodiment the system includes shut-down means to shut down the operation of the adaptive control system when the adaption fault detection means indicates a fault. Preferably in such an embodiment restart means are included which are adapted to restart the adaptive control system following a shut-down and wherein said shut-down means is adapted to disable said restart means after a predetermined number of shut-downs in a period of time to prevent restart.

In one embodiment the adaptive fault detection means comprises test means to periodically increase or decrease at least one secondary signal by a predetermined amount; and monitoring means to monitor said at least one residual signal and indicate a fault if during an increase or decrease in at least one said secondary signal there is no increase by a predetermined amount in at least one said residual signal.

In embodiments of the present invention the test means can be adapted to periodically increase or decrease the filter coefficients by a predetermined amount or a system can include gain means to amplify the or each secondary signal and the test means can be adapted to periodically increase or decrease the gain of said gain means by a predetermined amount.

Preferably the test means is adapted to decrease at least one said secondary signal by a proportion of up to 100%.

In order to reduce erroneous fault indication, and also to allow for fault detection during adaption, the monitoring means is preferably adapted to take an average of the change in said at one least residual signal over several periods in order to determine whether a fault condition exists.

Alternatively, in another embodiment of the present invention the test means is adapted to increase or decrease at least one said secondary signal during a period when there is no adjustment of said filter coefficients by said adaptive response filter means.

In a practical adaptive control system according to one embodiment of the present invention the secondary means is adapted to provide a plurality of secondary signals, said residual means is adapted to provide a plurality of residual signals, and said monitoring means is adapted to monitor said plurality of residual signals. This is a multichannel system and in such a system the test means can increase or decrease all the secondary signals by a predetermined amount or increase or decrease each said secondary signal in turn by a predetermined amount.

In one embodiment the undesired signals are undesired acoustic vibrations and the system includes at least one secondary vibration source adapted to receive said at least one secondary signal and provide at least one secondary vibration, and at least one sensor means adapted to measure residual vibrations resulting from the interference between said undesired and secondary vibrations and to provide at least one residual signal.

In such an acoustic system the test means is preferably operative to increase or decrease said at least one secondary signal such that the change in the residual vibrations is imperceptible to a person in the region of noise cancellation.

In another embodiment of the present invention the adaptive fault detection means comprises a filter coefficient change monitoring means to monitor the rate of change of the filter coefficients during adaption and indicate a fault if the rate of change exceeds a predetermined value.

In such an embodiment where filter coefficients are modified according to an algorithm the convergence of which can be varied using a convergence coefficient, the system includes convergence adjusting means to reduce the convergence coefficient for a period of time in response to detection of a fault by said adaption fault detection means.

In a further embodiment of the present invention the system includes a reference means to provide at least one reference signal having at least one harmonic frequency indicative of said undesired noise, and reference change means to monitor the rate of change of the frequency of at least one reference signal and indicate a fault if the rate of change is greater than a predetermined value. Such an embodiment is extremely useful for the cancellation of noise from the engine of a vehicle. If the engine misfires then the reference signal will be intermittent and effective noise cancellation is not possible.

In another embodiment of the present invention where the adaptive response filter means has second filter coefficients to model the response of the or each residual signal to at least one secondary signal, the system includes memory means containing at least one look-up table of predetermined second filter coefficient values; adaptive means to adaptively learn the values of the second filter coefficients; and second filter comparison means to compare the second filter coefficients with predetermined filter coefficients in a said look-up table and indicate a fault if any difference is greater than a predetermined amount.

Such an embodiment in an acoustic system provides for a means of learning the impulse response of the acoustic system which is effectively a model, and indicating a fault if this model lies outside what would be considered to be the normal range of acoustic responses within the region of noise cancellation.

The present invention also provides a method of actively reducing undesired signals comprising the steps of providing at least one secondary signal for interference with undesired signals; providing at least one residual signal indicative of the interference between said undesired and secondary signals; adjusting said at least one secondary signal using said at least one residual signal to reduce said at least one residual signal; detecting erroneous or faulty operation of the system, and indicating a fault in response thereto.

Examples of the present invention will now be described with reference to the drawings, in which.

Figure 1:
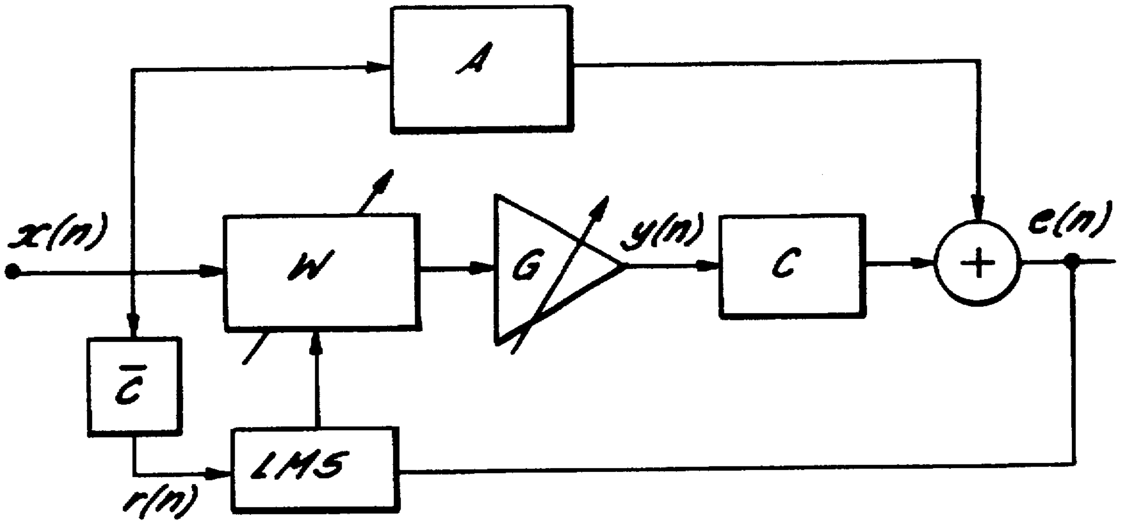
FIG. 1 illustrates schematically an adaptive control system utilising an adaptive response filter and a gain control according to one embodiment of the present invention.

Referring now to the drawings, FIG. 1 illustrates the operation of and adaptive control algorithm wherein a reference signal x(n) is received from a source of noise and represents undesired signals. The undesired signals pass through the path A to the region where cancellation is required. The reference signal x(n) is also passed through an adaptive response filter W which provides an output which is then passed through a gain control G to provide an output signal y(n). This signal in practice is modified before it is detected by residual signal detectors to provide the residual or error signal e(n). The modification could be the electrical path of the signals or in the case of an acoustic system the acoustic path from the output of a loudspeaker to a microphone. The error signal e(n) is then fed back to adaptively control coefficients of the adaptive response filter W. The coefficients of the adaptive response filter are adapted by using the reference signal x(n) and the error signal e(n) in an algorithm as described in WO88/02912.

FIG. 1 illustrates only a single channel system where there is only one reference signal, one drive signal and one error signal. However, in practice many reference signals, drive signals and error signals will be used in the system to provide a multichannel system wherein the error signals are reduced by the algorithm to reduce the mean square sum of the error signals. This is preferably performed by a least mean squares (LMS) algorithm. Thus the W filter acts on the reference signal x(n) to generate the drive signal y(n) which in an acoustic system is sent to a loudspeaker to produce a secondary vibration for cancelling undesired acoustic noise within a region.

During operation of the LMS algorithm, it is possible that the system develops a fault either in the outcome of the algorithm or in the hardware and it is therefore desirable to ensure that the system does not introduce more noise into the region than originated from the noise source. In other words, ideally the residual vibrations detected in the region of noise cancellation should be compared with and without active vibration control taking place. Such testing should take place periodically during operation of the system. This can be achieved by using the gain control G. The gain of gain control G can be varied between 0 and 1 to switch on and off the active vibration control. The error signals e(n) can then be compared at periods when cancellation is taking place and periods when cancellation is switched off. If there is a decrease in noise when the active control system is switched off, then clearly the output y(n) is contributing to the noise within the region. This increase is detected and indicates a fault in the operation of the control system. The system can either then shut down or performance optimisation can take place to try to remedy the fault.

The gain control G can also be controlled to increase the output y(n) as an alternative to decreasing the output y(n). This should also provide a decrease in the residual or error signal e(n) detected if the system is operating correctly. It is however more desirable to reduce the drive signal y(n) during this test procedure to reduce the noise produced in the region.

The gain control G when turning down the output y(n) can reduce the output from 100% to 0. There is no requirement to completely shut down the output y(n) during a test and simply a small reduction in the output y(n) is sufficient to see an increase in the error signal e(n). This is clearly advantageous since during the short testing period the rise in residual noise within the region need not be large. Typically therefore the gain factor G could be anything from 0 to 1 and preferably 0.5 to 0.9. There is however a trade-off in that if the output y(n) is not reduced by a large amount, then the accuracy of detection of a fault is reduced. In an acoustic system the reduction in the output y(n) should ideally be too small to provide any perceptible or audible difference in the residual vibrations. This can however reduce the accuracy of the monitoring of the stability of the system.

The increase or decrease in y(n) can either be gradual or a sharp change. In order to reduce the likelihood of falsely shutting down the system, values over several periods of testing can be taken and averaged. This averaging not only compensates for noise within the system but also allows for the monitoring of the operation of the system during adaption. Alternatively, the testing can take place during a period when there is no adjustment of the filter coefficients of the W filter.

In the diagram shown in FIG. 1 only a single drive signal x(n) is shown. In a multichannel system with a number of drive signals then either all of the signals can be increased or decreased simultaneously or they can be increased or decreased in turn.

Although the gain control G is shown separately to the W filter, in practice these can be combined such that the filter coefficients are varied by a predetermined amount to provide the required increase or decrease in the output y(n).

If a fault is detected then the system can be shut down. After a period of time the system can automatically restart adaptive control. If the system is restarted and shut down for a number of times within a period of time, then clearly the fault in the system remains and the system will shut down totally and await to be inspected by an engineer. Before restarting system parameters can be adjusted to try to achieve a successful restart.

Figure 2:
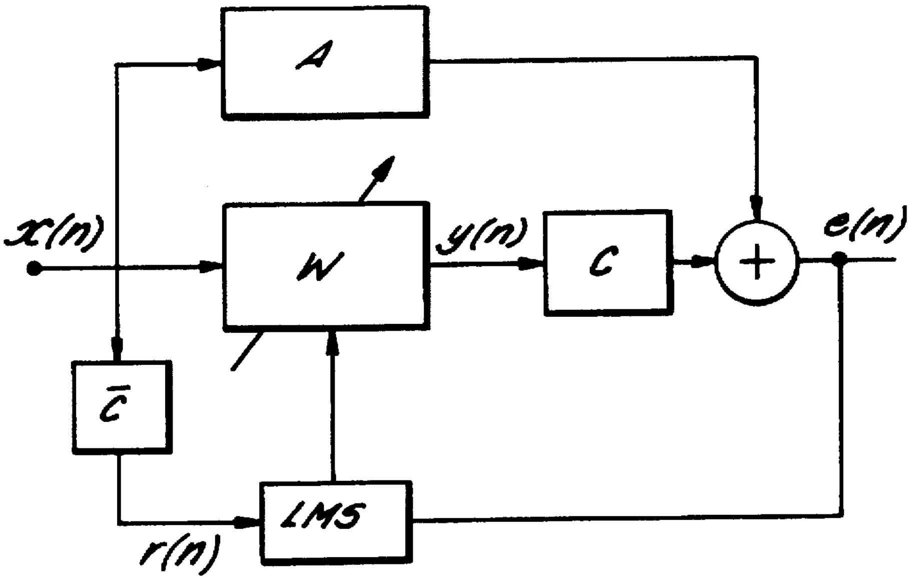
FIG. 2 illustrates schematically an adaptive control system including a model $\overline{C}$ which is the impulse response $\overline{C}$ of the system.

Referring now to FIG. 2, the arrangement illustrated is of a conventional single channel adaptive control system. Using this arrangement another method of monitoring the safe operation of the adaptive control system is to monitor the rate of change of the filter coefficients during adaption and indicate a fault if the rate of change exceeds a predetermined value. It is well known that one sign of a fault in the operation of the algorithm is rapid changes in the adaption. This fault detecting arrangement however will not work very well for a system which requires to be able to rapidly adapt to changes in noise. The predetermined value for the rate of change of the filter coefficients in the W filter would be determined by the operating conditions.

Alternatively to shutting down the system when a large rate of change in the W coefficient is measured, the convergence coefficient in the LMS algorithm can be reduced for a period of time in order to reduce the rate of change of the W filter coefficients. This will act to smooth out the effect of rapid but short-lived changes in the W filter coefficient values.

Instead of measuring the rate of change of W it is also possible to measure the rate of change of the secondary signal y(n).

Although FIG. 2 illustrates a single channel system, the rate of change of an array of W filter coefficients for a multichannel system can be measured in order to monitor the safe operation of the system.

In another embodiment of the present invention which uses the arrangement of FIG. 2, where a reference signal is provided which is at least one harmonic frequency and indicative of the undesired signal, the rate of change of the frequency of the reference signal can be monitored and a fault can be indicated if the rate of change is greater than a predetermined value. Such an arrangement can be used in a noise cancelling system for cancelling noise from the engine of a vehicle. A signal from the engine, such as from the coil, will provide harmonics related to the noise generated by the engine. This is used to cancel noise within the cabin. If however the engine misfires then there will be rapid changes in the frequency of the reference signal and effective cancellation cannot be achieved. Thus if there are rapid changes in the frequency of the reference signal the adaptive control system can be shut down. There can also be a number of reference signals monitored simultaneously where there are multiple sources by engines in an aircraft.

Figure 3:
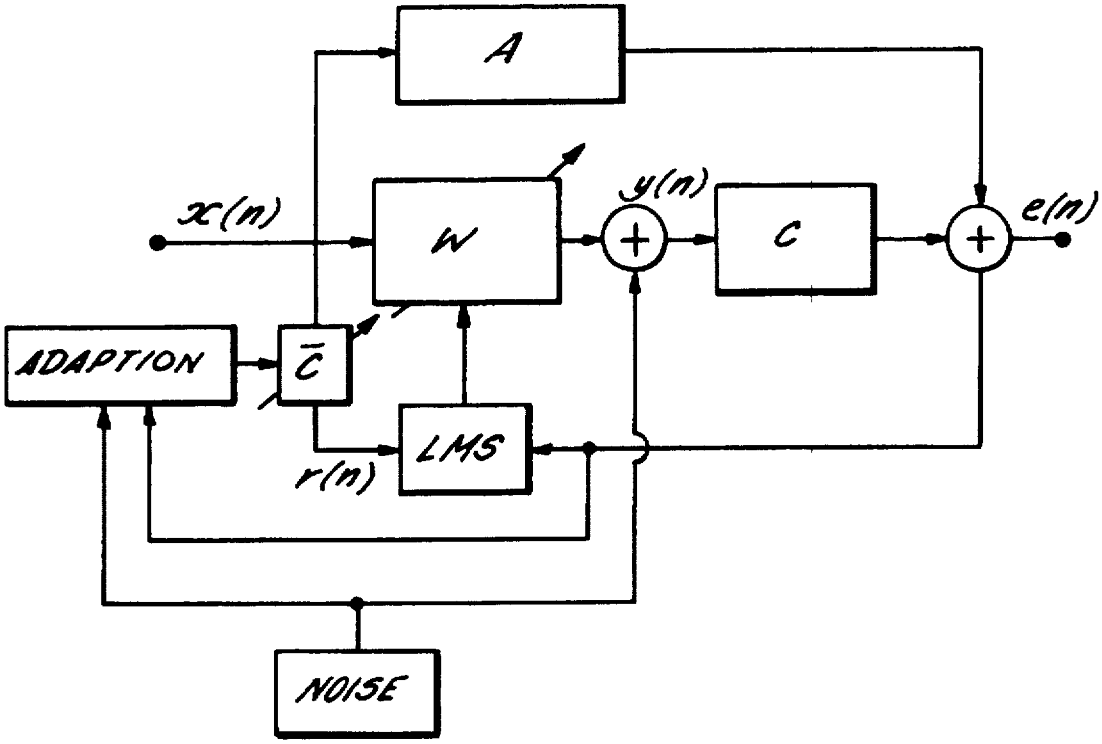
FIG. 3 illustrates schematically the adaptive control system of FIG. 2 with an arrangement for adaptively learning the impulse response.

Referring now to FIG. 3, which illustrates a single channel adaptive control system, the impulse response C of the system is compensated for by the use of a $\bar{C}$ filter as in FIG. 2. The $\bar{C}$ filter provides a model of the response of the error signals e(n) to the drive signal y(n). In an acoustic system this represents the acoustic response within the region of noise cancellation. In the arrangement shown in FIG. 3 the response of the system is adaptively learnt by inputting a white noise signal through the system and comparing this with the detected noise in order to adaptively determine the coefficients of the $\bar{C}$ filter. The white noise input to the system is of low level such that it does not contribute significantly to the noise level within the region of cancellation. The stability of the adaptive control system can be monitored by comparing the estimated or learnt coefficients of the $\bar{C}$ filter with coefficients stored in a look-up table. If the coefficient values are outside an expected range which corresponds to the extremes of the model then it is assumed to be a fault condition. The white noise can either be emitted continuously or only during initialisation of the system in which case the $\bar{C}$ coefficients are only learnt during this initialisation.

FIGS. 1, 2 and 3 illustrate the operation of a single channel adaptive control system in the time domain. For a multichannel system there will be a number of error signals e(n) and drive signals y(n). Thus where there are m sources the output $y_m(n)$ is given by $$y_m(n) = \sum_{i=0}^{I-1} W_{mi}(n)x(n-i)$$

where i=the filter coefficient number

I=the number of filter coefficients $W_{mi}(n)$=the $i^{th}$ filter coefficient value x(n)=reference signal n=sample rate The sampled output from the $l^{th}$ error sensor $e_l(n)$ is equal to the sum of the contributions from the primary source of undesired signals $d_l(n)$ and each of the secondary sources m. The response of the path between the $m^{th}$ secondary source and the $l^{th}$ sensor is modelled by a $J^{th}$ order FIR filter with coefficients $C_{lmj}$ so that $$e_l(n) = d_l(n) + \sum_{m=1}^{M} \sum_{j=0}^{J-1} C_{lmj} Y_m(n-j)$$

In order to generate the correct drive signals $y_m$ (n) to reduce the error signals $e_l$ (n) the coefficients of the adaptive filter W must be adapted using the LMS algorithm. A stochastic gradient algorithm to achieve this is given by $$W_{mi}(n+1) = W_{mi}(n) + \mu \sum_{l=1}^{L} e_l(n) r_{lm}(n-i)$$

where μ is a convergence coefficient and $r_{lm}(n)$ is a sequence formed by filtering the reference signal x(n) using $C_{lmj}$. The sequence can be given by $$r_{lm}(n) = \sum_{j=0}^{J-1} x(n-j) C_{lmj}$$

It can thus be seen that for a single channel system the $\bar{C}$ filter comprises J values which equate to the number of taps in a tap delay line. These values comprise the look-up table for the single channel system.

Figure 4:
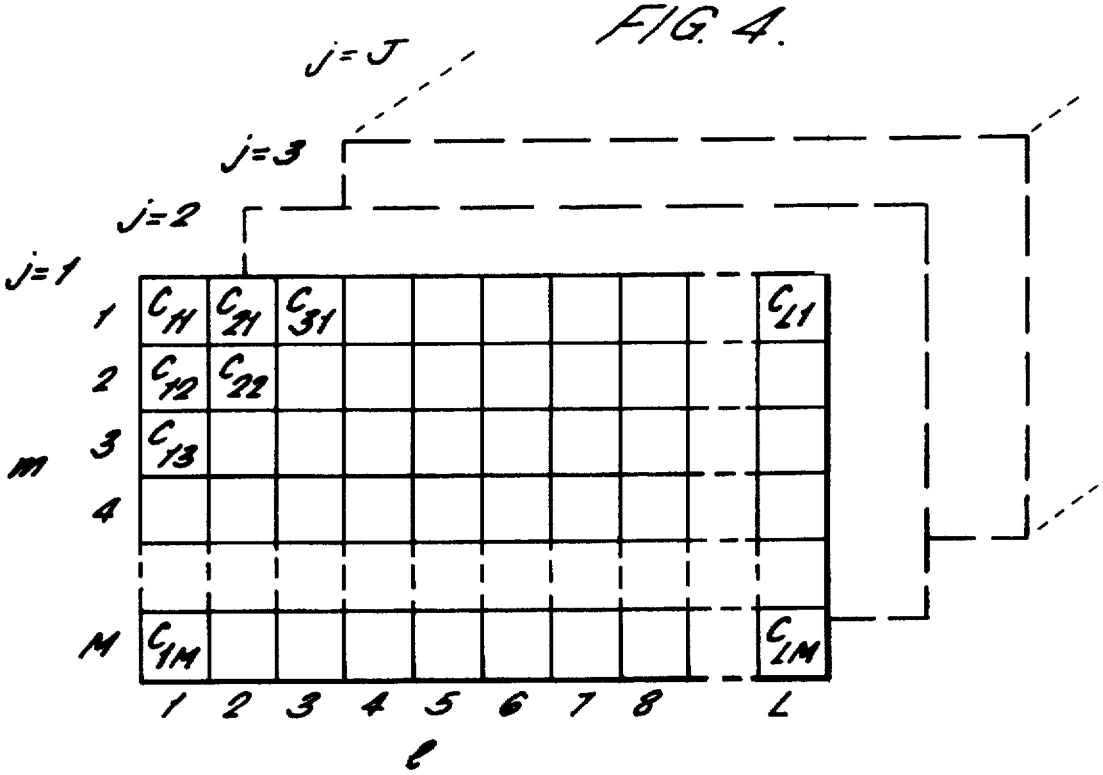
FIG. 4 is a schematic illustration of the look-up tables containing $C_{lmj}$ values.

For the multichannel system the number of values increases by lm. The values for the $\bar{C}$ coefficients in the $\bar{C}$ filter can thus be represented as a three dimensional matrix. Such is shown in FIG. 4.

In order to provide for fault detection then a matrix of predetermined $C_{lmj}$ values which defines average normal operating $C_{lmj}$ values which would be expected in the system are prestored. When the system of FIG. 3 is operational the $C_{lmj}$ values are learnt and the estimated $C_{lmj}$ matrix of values can then be compared with the predetermined values. If the difference between any values is greater than a predetermined amount then a fault condition is indicated. Since the $C_{lmj}$ values identify the channel associated with the value it is possible for the location of the fault to be indicated e.g. in an acoustic system a channel comprises an acoustic path between a loud speaker and a microphone and hence if one of these components is faulty, then the learnt $C_{mj}$ coefficients for this channel are likely to be quite different to the expected normal values stored in the look-up tables.

The method of detecting a fault using look-up tables of $C_{lmj}$ coefficients described above does however require a considerable amount of memory. This memory requirement can however be reduced by generating two vectors for the $\hat{C}$ filter.

Figure 5:
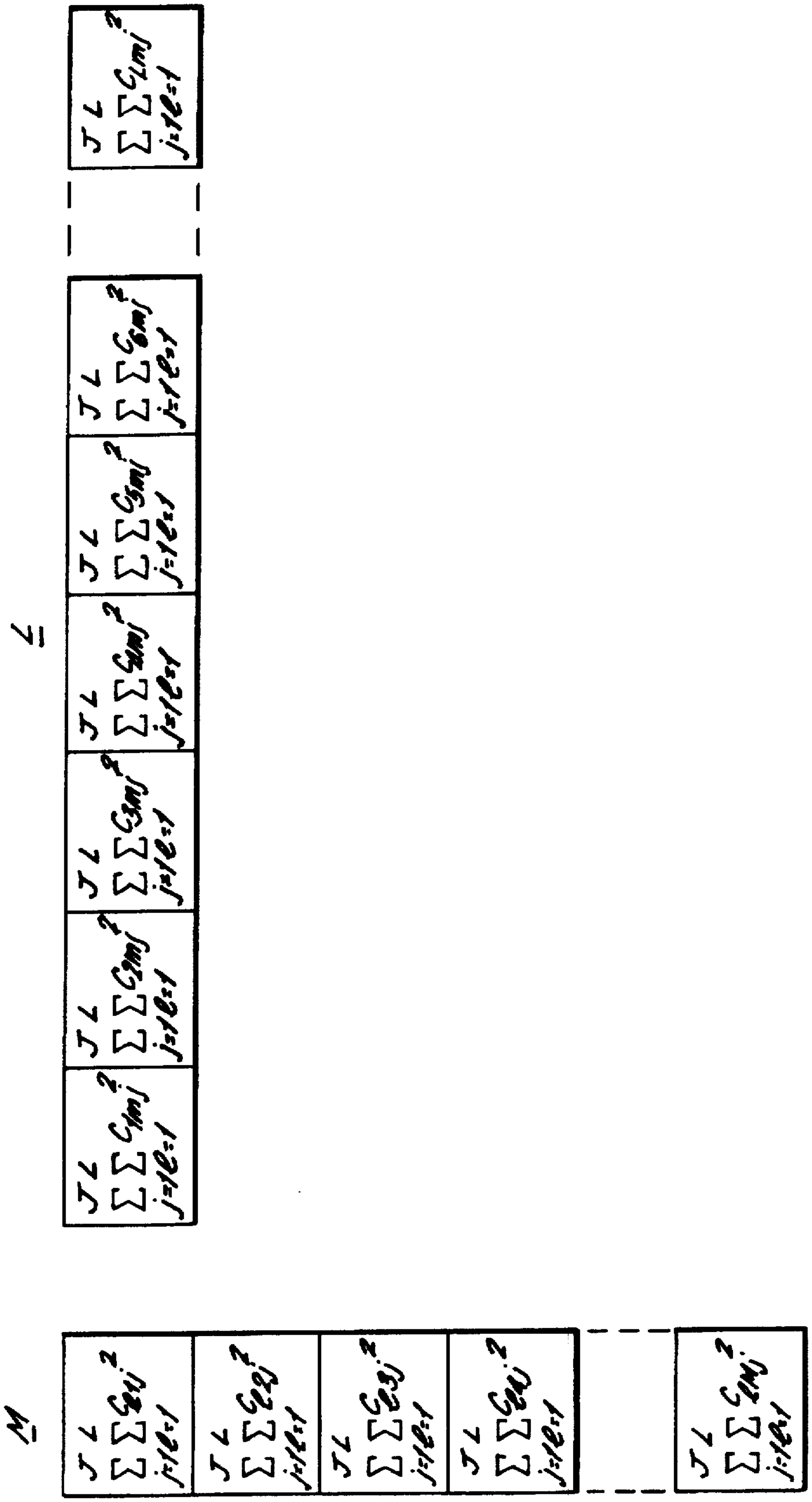
FIG. 5 is a schematic illustration of the vector pair M and L generated from the $C_{lmj}$ values.

FIG. 5 schematically illustrates the two vectors M and L which are generated by summing $C_{lmj}$ coefficients in the matrix. The M vector is generated from the $C_{lmj}$ matrix by, for each source, summing the coefficient values for the response of each error sensor l to a source m for all coefficient orders J i.e.

$$\sum_{j=1}^{J}\sum_{l=1}^{L} C_{lmj}^2$$

M thus gives the power couplings between each source and each of the error sensors.

The L vector is generated from the $C_{lmj}$ matrix by, for each error sensor, summing the coefficient values for the response of an error sensor l to each source m for all coefficient orders J i.e.

$$\sum_{j=1}^{J}\sum_{m=1}^{M} C_{lmj}^2$$

L thus gives the power couplings between each error sensor and all of the sources.

Once the two vectors M and L have been generated from the look-up tables of $C_{lmj}$ values, there is no need to store the look-up tables for fault detection. Only the M and L vectors need to be stored since these can be compared with M and L vectors generated from the estimated $C_{lmj}$ values to determine whether or not a fault condition exists. This method reduces the memory requirement of the system compared to the method which uses direct comparison of $C_{lmj}$ values. Using the vectors L and M it is still possible to identify the channel which is faulty.

Figure 6:
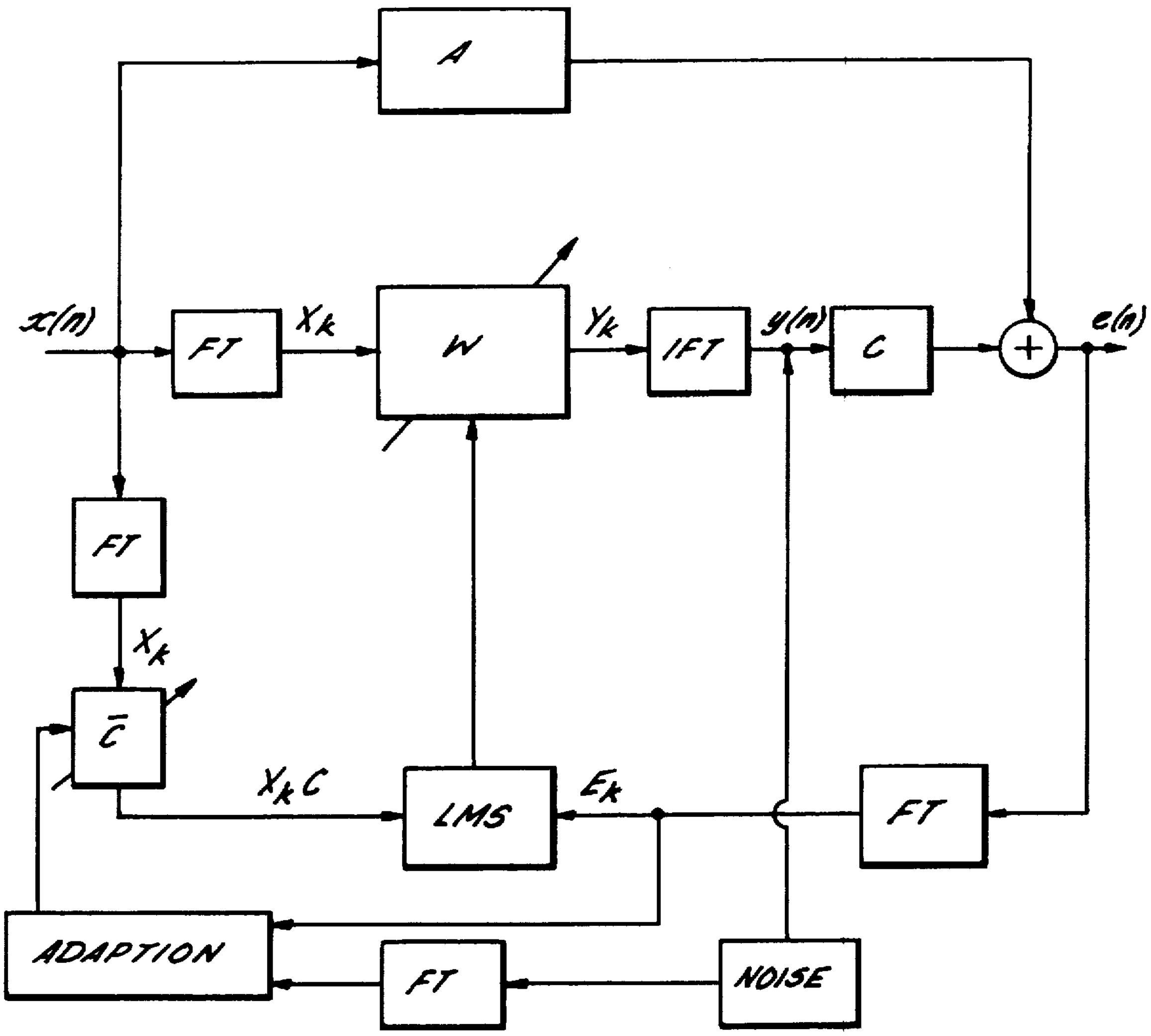
FIG. 6 illustrates schematically an adaptive control system operating in the frequency domain including an arrangement for adaptively learning the transfer function of the system.
Figure 7:
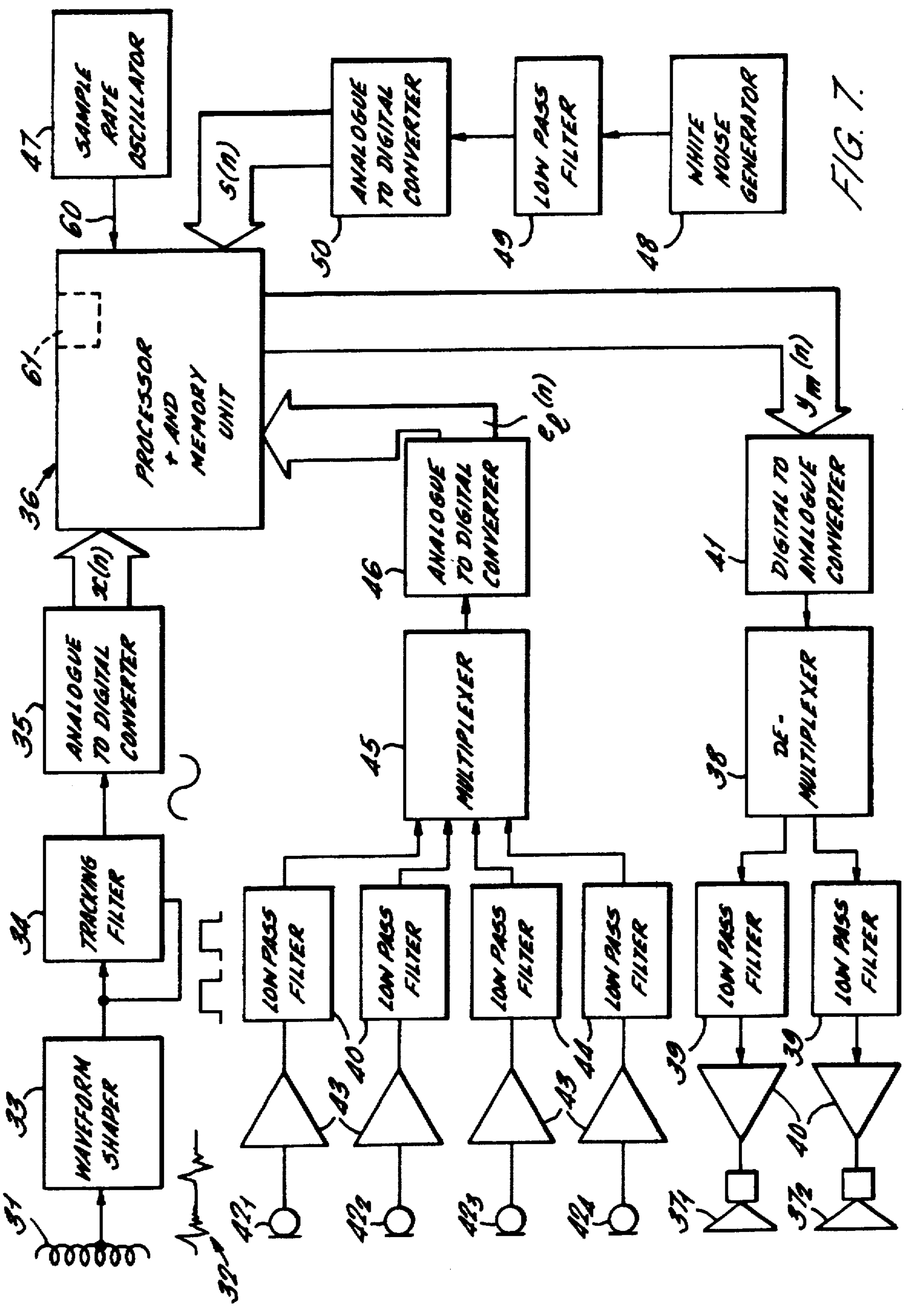
FIG. 7 is a schematic diagram of a practical arrangement according to one embodiment of the present invention.

Although the foregoing embodiments described with reference to FIGS. 3, 4 and 5 refer to the operation of the algorithm in the time domain the technique is equally applicable for the frequency domain. A frequency domain system is illustrated in FIG. 6 which is similar to FIG. 3 except for the inclusion of the fourier transforms FT and inverse fourier transform IFT.

In the frequency domain the update equation becomes $$W_{k+1}=W_k-\mu(C\,X_k)^H E_k$$

where $X_k$ is a vector of reference signal spectra, $E_k$ is a matrix of error signal spectra, and C is a matrix of complex filter coefficients.

The $\hat{C}$ filter coefficients in the frequency domain are complex numbers or vectors representing amplitude and phase at a frequency i.e. for a channel the filter coefficient $C_k$ represents the transfer function for the channel. Thus for the frequency domain the C matrix in FIG. 4 has dimensions L×M×K.

Since in the frequency domain the is no coupling between frequencies (k) it is possible to use vectors $M_k$ and $L_k$ which are not summed over frequency. The equation for the M values for $M_k$ is $$\sum_{l=1}^{L} C_{lm}C_{lm}^*$$

where $C^*_{lm}$ is the complex conjugate of $C_{lm}$ and for $L_k$ the equation for the L values is $$\sum_{m=0}^{M} C_{lm}C_{lm}^*$$

This provides K pairs of $M_k$ and $L_k$ vectors.

As described herein above for the time domain these vectors can be used for fault detection, either as $M_k$ or $L_k$ whereby $M_k$ and $L_k$ vectors for the look-up tables of prestored values of $C_{lmk}$ and for the estimated values for $C_{lmk}$ must be compared, or as M and L whereby the vectors are summed over frequency K. The values for M are given by $$\sum_{k=1}^{K}\sum_{l=1}^{L} C_{lmk}C_{lmk}^*$$

and for L by $$\sum_{k=1}^{K}\sum_{m=1}^{M} C_{lmk}C_{lmk}^*$$

If the frequency averaged vectors L and M are used this reduces memory requirements. However frequency information is lost. For fault detection in a system it can generally be assumed that the summation of the coefficients over frequency will still allow for fault detection since a fault in a channel is likely to effect the summation.

An additional benefit of generating the vector pairs $M_k$ and $L_k$ for the estimated $C_{lmk}$ coefficients is that the $M_k$ vector can be used to normalise the convergence rate of the LMS algorithm used to update the W filter coefficients. The LMS algorithm in the frequency domain is given by $$W_{k+1}=W_k-\mu(C\,X_k)^H E_k$$

where μ is a convergence coefficient.

When the system is initialised an initial preset value for the convergence coefficient $\mu_{preset}$ is stored. However since the estimated $C_{lmk}$ values learnt by the system can vary considerably from the predetermined $C_{lmk}$ values due to tolerances or deterioration in components, there is a need to optimise the convergence coefficient to achieve convergence of the update LMS algorithm. This is achieved by normalising the convergence coefficient using the equation $$\mu_k=\frac{\mu_{preset}}{\underline{M_k}}$$

There are two ways in which normalisation using $M_k$ can be achieved. For a given k, M values can be obtained from $$\mu_m=\sum_{l=1}^{L} C_{lm}C_{lm}^*$$

The maximum value μ(max) of $\mu_m$ is then used for normalisation i.e.

$$\mu_k = \frac{\mu_{preset}}{\mu_k(\max)}$$

Alternatively normalisation can be achieved by using a summation of the vector values $$\mu_k(\mathrm{sum}) = \sum_{m=1}^{M} \sum_{l=1}^{L} C_{lmk} C_{lmk}^*$$

Such that $$\mu_k = \frac{\mu_{preset}}{u_k(\mathrm{sum})}$$

Thus using the K vectors $M_k$, K convergence coefficients $\mu_k$ are generated for use within the update equation in the LMS algorithm. It is these modified values which are used instead of the preset value $\mu_{preset}$ to optimise convergence of the algorithm.

The amount by which the preset value $\mu_{preset}$ is modified is dependent on the change in the expected or predetermined response of the error sensors l to the sources m. Thus the preset convergence coefficient input into the system initially is less critical since it is optimised.

Although the convergence coefficient optimisation has been described hereinabove with regard to optimising convergence of the frequency domain LMS algorithm, it is equally applicable to the optimisation of the time domain LMS algorithm. However the $\bar{C}$ filter coefficients must be calculated or transformed into the frequency domain to enable their use via the $M_k$ vectors in normalising the convergence coefficient. The normalised convergence coefficient $\mu_k$ is then used to calculate the update in the frequency domain, although the W filtering can actually take place in the time domain.

The normalisation of the convergence coefficient can be used with any of the fault detection techniques described hereinbefore, or on its own as a means for compensating for changes in the transfer functions of the system.

In all of the above methods any instability in the algorithm as well as faults in components can be protected against to provide safe operation of the adaptive control system.

Hereinabove the shut-down of the adaptive control system has been discussed. This can either be achieved by removing power from the system or by reducing the effect of the update term in the algorithm.

The algorithm for the adaptive filtering can be given by:

$$w(n+1)=w(n)-[\mu(e(n)r(n-i))+E(y(n)x(n-i))]$$

where

μ=a convergence coefficient, and

E=an effort weighting factor.

During normal adaption E can equal 0 and therefore the speed of adaption depends on the convergence coefficient. During adaption for a multichannel system certain outputs y(n) can be decreased by increasing the effort weighting. Thus the size of the W filter coefficients can be reduced and switched off by increasing the contribution from the effort weighting term E(y(n)x(n−i)).

Any of the monitoring techniques described hereinabove can be used alone or in any combination to provide careful monitoring of the operation of an adaptive control system. If a fault is recognised using any of the techniques, then the performance of the adaptive control system can be optimised by varying the contributions from the convergence coefficient μ and the effort weighting E in the update of the W filter coefficients.

Before restarting the system the values of E and μ can be adjusted to try to result in a successful restart. Alternatively $\bar{C}$ could be relearnt before restarting or any other operating parameters could be adjusted. The present invention is also applicable for adaptive control systems which operate partially or wholly in the frequency domain whether the algorithm operates in the time or frequency domain.

FIG. 6 illustrates schematically the construction of an active vibration control system for use in a motor vehicle. In this arrangement there is shown a multichannel system having four error sensors in the form of microphones $\mathbf{42}_1$ through $\mathbf{42}_4$, two secondary vibration sources in the form of loudspeakers $\mathbf{37}_1$ and $\mathbf{37}_2$ and one reference signal x(n) formed from a signal 32 from the ignition coil 31 of the vehicle. In this arrangement the reference signal x(n) is formed from the ignition coil signal 32 by shaping the waveform in a waveform shaper 33 and using a tracking filter 34 to provide a sinusoidal waveform. This is then converted to a digital signal by the analogue to digital converter 35 for input to the processor 36. The processor 36 is provided with a memory 61 to store data as well as the program to control the operation of the processor 36. The signal 32 therefore provides a direct measure of the frequency of rotation of the engine and this can be used to generate harmonics within the processor, which harmonics are to be cancelled within the cabin of the vehicle.

The processor 36 generates a drive signal $y_m(n)$ which is converted to an analogue signal by the digital to analogue 41 and demultiplexed by the demultiplexer 38 for output through low pass filters 39 and amplifiers 40 to loudspeakers $\mathbf{37}_1$ and $\mathbf{37}_2$. This provides a secondary vibration within the vehicle cabin to cancel out vibrations generated by the primary source of vibration which comprises the engine. In the case of an engine, the rotation frequency comprises the primary frequency of vibration which has harmonics. It is these harmonics which are to be cancelled out within the vehicle cabin.

Microphones $\mathbf{42}_1$ through $\mathbf{42}_4$ detect the degree of success in cancelling the vibrations and provide error signals which are amplified by amplifiers 43, low pass filtered by low pass filters 44 and multiplexed by the multiplexer 45 before being digitally converted by the analogue to digital converter 46 to provide the error signal $e_l(n)$.

Thus the processor 36 is provided with a reference signal x(n), error signal $e_l(n)$ and output to drive signal $y_m(n)$. The processor 36 is also provided with a constant sample rate 60 from a sample rate oscillator 47. This controls the sampling of the signals. The processor 36 is also provided with a noise signal s(n). The white noise generator 48 generates random or pseudo-random noise which preferably is uncorrelated with a reference signal x(n). This is passed through a low pass filter 49 and converted to a digital signal s(n) by the analogue to digital converter 50. Within the processor 36 the noise signal s(n) from the white noise generator is also added to the drive signal $y_m(n)$ so that a low level noise is output from the loudspeakers $\mathbf{37}_1$ and $\mathbf{37}_2$. The noise signal s(n) is also processed by the processor 36 together with the error signal $e_l(n)$ in order to determine the coefficients of the $\bar{C}$ matrix as hereinbefore described.

Although in FIG. 6 the digital converters 35 and 46 and the analogue to digital converter 41 are shown separately, such can be provided in a single chip. The processor receives a clock signal 60 from the sample rate oscillator and it thus operates at a fixed frequency related to the frequency of vibrations to be reduced only by the requirement to meet Nyquist's criterion. The processor 36 can be a fixed point processor such as the TMS 320 C50 processor available from Texas Instruments. Alternatively, the floating point processor TMS 320 C30 also available from Texas Instruments can be used to perform the algorithm.

Although the arrangement shown in FIG. 6 illustrates a system for cancelling engine noise wherein only a single reference signal is provided, the system can also be used for cancelling road noise where more than one reference signal is produced, such as vibrations from each wheel of the vehicle. Alternatively a number of tonal reference signals can be provided for the adaptive control system.

Although the foregoing embodiments of the invention have been described primarily with a view to the cancellation of vibrations, the present invention is not so limited and is applicable to the active cancellation of any undesired signals.

We claim:

1. An adaptive control system for reducing undesired signals comprising: interference means to provide at least one secondary signal for interference with said undesired signals; residual means to provide at least one residual signal indicative of the interference between said undesired and secondary signals; adapting means operative to adjust said at least one secondary signal using said at least one residual signal to reduce said at least on residual signal; and adapting fault detection means to detect erroneous or faulty operation of the system and provide an indication of a fault; wherein said adapting fault detection means comprises test means to periodically increase or decrease said at least one secondary signal by a predetermined amount; and monitoring means to monitor said at least one residual signal and indicate a fault if during an increase or decrease in said at least one secondary signal there is, respectively, no decrease or increase by a predetermined amount in said at least one residual signal.

2. An adaptive control system as claimed in claim 1, wherein said adapting means comprises adaptive response filter means having filter coefficients and adjusts said at least one secondary signal using said filter coefficients.

3. An adaptive control system as claimed in claim 2, wherein said test means periodically increases or decreases said filter coefficients by a predetermined amount.

4. An adaptive control system as claimed in claim 2, wherein said test means increases or decreases said at least one secondary signal during a period when there is no adjustment of said filter coefficients by said adaptive response filter means.

5. An adaptive control system as claimed in claim 1 including shut-down means to shut-down the operation of the adaptive control system when the adapting fault detection means detects a fault.

6. An adaptive control system as claimed in claim 5 including restart means to restart the adaptive control system following a shut-down; said shut-down means disabling said restart means after a predetermined number of shut-downs in a period of time to prevent restart.

7. An adaptive control system as claimed in claim 1, including gain means to amplify each secondary signal, said test means periodically increasing or decreasing the gain of said gain means by a predetermined amount.

8. An adaptive control system as claimed in claim 1, wherein said test means can decrease said at least one secondary signal by a proportion of up to 100%.

9. An adaptive control system as claimed in claim 1, wherein said monitoring means takes an average of the change in said at least one residual signal over several periods in order to determine whether a fault condition exists.

10. An adaptive control system as claimed in claim 1, wherein said interference means provides a plurality of secondary signals, said residual means provides a plurality of residual signals, and said monitoring means monitors said plurality of residual signals.

11. An adaptive control system as claimed in claim 10, wherein said test means increases or decreases all said secondary signals by a predetermined amount.

12. An adaptive control system as claimed in claim 10, wherein said test means increases or decreases each said secondary signal in turn by a predetermined amount.

13. An adaptive control system as claimed in claim 1, wherein said undesired signals are undesired acoustic vibrations; the system including at least one secondary vibration source adapted to receive said at least one secondary signal and provide at least one secondary vibration; and at least one sensor means adapted to measure residual vibrations resulting from interference between said undesired and secondary vibrations and to provide said at least one residual signal.

14. An adaptive control system as claimed in claim 13, wherein said test means is operative to increase or decrease said at least one secondary signal such that the change in the residual vibrations is imperceptible.

15. An adaptive control system as claimed in claim 1 including reference means to provide at least one reference signal having at least one harmonic frequency indicative of said undesired noise, and reference change means to monitor the rate of change of the frequency of at least one said reference signal and indicate a fault if the rate of change is greater than a predetermined value.

16. An adaptive control system for reducing undesired signals comprising: interference means to provide at least one secondary signal for interference with said undesired signals; residual means to provide at least one residual signal indicative of the interference between said undesired and secondary signals; adapting means operative to adjust said at least one secondary signal using said at least one residual signal to reduce said at least one residual signal; and adapting fault detection means to detect erroneous or faulty operation of the system and provide an indication of a fault; wherein said adapting means comprises adaptive response filter means having filter coefficients and adjusts said at least one secondary signal using said filter coefficients; and, wherein said adapting fault detection means comprises filter coefficient change monitoring means to monitor the rate of change of the filter coefficients during adapting and to indicate a fault if the rate of change exceeds a predetermined value.

17. An adaptive control system as claimed in claim 16, wherein said filter coefficients are modified according to an algorithm the convergence of which can be varied using a convergence coefficient, said system including convergence adjusting means to reduce the convergence coefficient for a period of time in response to detection of a fault by said adaptive fault detection means.

18. An adaptive control system for reducing undesired signals comprising: interference means to provide at least one secondary signal for interference with said undesired signals; residual means to provide at least one residual signal indicative of the interference between said undesired and secondary signals; adapting means operative to adjust said at least one secondary signal using said at least one residual signal to reduce said at least one residual signal; and adapting fault detection means to detect erroneous or faulty operation of the system and provide an indication of a fault; wherein said adapting means comprises adaptive response filter means having filter coefficients and adjusts said at least one secondary signal using said filter coefficients; and wherein said adapting fault detection means monitors the rate of change of said at least one secondary signal and indicates a fault if the rate of change exceeds a predetermined amount.

19. An adaptive control system for reducing undesired signals comprising: interference means to provide at least one secondary signal for interference with said undesired signals; residual means to provide at least one residual signal indicative of the interference between said undesired and secondary signals; adapting means operative to adjust said at least one secondary signal using said at least one residual signal to reduce said at least one residual signal; and adapting fault detection means to detect erroneous or faulty operation of the system and provide an indication of a fault; wherein:

said adapting means comprises adaptive response filter means having filter coefficients and adjusts said at least one secondary signal using said filter coefficients;

wherein said adaptive response filter means has second filter coefficients which model the response of the or each residual signal to the respective secondary signal; and wherein said system includes memory means adapted to store predetermined second filter coefficient data; second adapting means operative to adaptively learn second filter coefficient data; and filter comparison means to compare said learned second filter coefficient data with said predetermined second coefficient data and indicate a fault if any difference is greater than a predetermined amount;

said interference means provides a plurality of secondary signals and said residual means provides a plurality of residual signals;

said memory means is adapted to store at least one first preset vector containing for each secondary signal the sum of the contribution of the secondary signal received at each residual signal, and at least one second preset vector containing for each residual signal the sum of the contribution of each secondary signal received at the residual signal;

said second adapting means is operative to learn values for the second filter coefficients; and said filter comparison means is operative to generate at least one first estimated vector containing for each secondary signal the sum of the contribution of the secondary signal received at each residual signal, and at least one second estimated vector containing for each residual signal the sum of the contribution of each secondary signal received at the residual signal, and to compare said first and second preset vectors with said first and second estimated vectors and indicate a fault if any difference is greater than a predetermined amount.

20. An adaptive control system as claimed in claim 19 wherein said second adapting means learns second filter coefficients which model the impulse response between each residual signal and each secondary signal, said second filter coefficients having a plurality of time related values for each impulse response; and said memory means stores said first and second preset vectors containing a summation of the time related values for each impulse response.

21. An adaptive control system as claimed in claim 19 wherein said second adapting means learns second filter coefficients which model the transfer function between each residual signal and each secondary signal, said second filter coefficients having a plurality of frequency related values for each transfer function; said memory means stores a plurality of said first and second preset vectors which are frequency related; and said filter comparison means is operative to generate said at least one first and second estimated vectors which are related to frequency, and to compare said first and second preset vectors which are frequency related to said at least one first and second estimated vectors and indicate a fault if any difference between the frequency related vectors is greater than a predetermined amount.

22. An adaptive control system as claimed in claim 21 wherein said memory means stores a preset convergence coefficient for use by said adapting means to converge the adapting of said at least one secondary signal; including convergence coefficient normalizing means to normalize the preset convergence coefficient with respect to said at least one first estimated vector.

23. An adaptive control system as claimed in claim 22 wherein said convergence coefficient normalizing means normalizes the preset convergence coefficient with respect to a maximum value within each first estimated vector.

24. An adaptive control system as claimed in claim 22 wherein said convergence coefficient normalizing means normalizes the preset convergence coefficient with respect to a summation of the values within each first estimated vector.

25. An adaptive control system as claimed in claim 19 wherein said second adapting means learns second filter coefficients which model the transfer function between each residual signal and each secondary signal, said second filter coefficients having a plurality of frequency related values for each transfer function; said memory means stores said first and second preset vectors which are summed over frequency; and said filter comparison means is operative to generate said first and second estimated vectors which are summed over frequency, and to compare said first and second preset vectors with said first and second estimated vectors, and indicate a fault if any difference is greater than a predetermined amount.

26. An adaptive control system for reducing undesired signals comprising: interference means to provide at least one secondary signal for interference with said undesired signals; residual means to provide at least one residual signal indicative of the interference between said undesired and secondary signals; first adapting means comprising adaptive response filter means having first filter coefficients to adjust said at least one secondary signal, and second filter coefficients which model the response of each residual signal to respective each secondary signal; second adapting means operative to learn the values of the second filter coefficients; and memory means for storing a preset convergence coefficient; said second adapting means generating at least one vector containing for each secondary signal the sum of the contribution of the secondary signal received at each residual signal; the system including convergence coefficient normalization means to normalize said preset convergence coefficient with respect to said vector; said adaptive response means being operative to use said normalized convergence coefficient to adjust said at least one secondary signal.

27. An adaptive control system as claimed in claim 26 wherein said convergence coefficient normalization means normalize the preset convergence coefficient with respect to a maximum value within the or each said vector.

28. An adaptive control system as claimed in claim 26 wherein said convergence coefficient normalizing means normalizes the preset convergence coefficient with respect to a summation of the values within each said vector.

29. An adaptive control system as claimed in claim 26 wherein said second adapting means learns said second filter coefficients which model the transfer function between the or each residual signal and the or each secondary signal, said second adapting means being operative to generate said at least one vector such that each vector has a frequency relationship; said convergence coefficient normalization means being operative to generate at least one normalized convergence coefficient related in frequency to said at least one vector.

* * * * *